(12) United States Patent
Ellis-Monaghan et al.

(10) Patent No.: US 10,191,213 B2
(45) Date of Patent: Jan. 29, 2019

(54) SHIELDING STRUCTURES BETWEEN OPTICAL WAVEGUIDES

(71) Applicant: INTERNATIONAL BUSINESS MACHINES CORPORATION, Armonk, NY (US)

(72) Inventors: John J. Ellis-Monaghan, Grand Isle, VT (US); Jeffrey P. Gambino, Westford, VT (US); Mark D. Jaffe, Shelburne, VT (US); Kirk D. Peterson, Jericho, VT (US); Jed H. Rankin, Richmond, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 920 days.

(21) Appl. No.: 14/151,138

(22) Filed: Jan. 9, 2014

(65) Prior Publication Data
US 2015/0192735 A1    Jul. 9, 2015

(51) Int. Cl.
*G02B 6/122* (2006.01)
*G02B 6/125* (2006.01)
(Continued)

(52) U.S. Cl.
CPC ............. *G02B 6/122* (2013.01); *G02B 6/125* (2013.01); *G02B 6/136* (2013.01); *G02B 1/045* (2013.01); *G02B 6/132* (2013.01); *G02B 2006/121* (2013.01); *G02B 2006/12097* (2013.01); *G02B 2006/12104* (2013.01); *G02B 2006/12126* (2013.01)

(58) Field of Classification Search
None
See application file for complete search history.

(56) References Cited

U.S. PATENT DOCUMENTS 4,999,686 A * 3/1991 Autier .................... G02B 6/125
                                                           385/130
5,696,039 A * 12/1997 Sugawara ............... C03C 3/062
                                                             501/64
(Continued)

FOREIGN PATENT DOCUMENTS

| IN | 2239/DEL/1995 | | 5/2011 |
| JP | 03004205 | A * | 1/1991 |
| JP | 2002236231 | A * | 8/2002 |

OTHER PUBLICATIONS

Wang et al., Near-infrared absorbing organic materials, 2004, Pure Appl. Chem., vol. 76, Nos. 7-8, pp. 1435-1443.*

(Continued)

*Primary Examiner* — Ryan Lepisto
*Assistant Examiner* — Erin Chiem
(74) *Attorney, Agent, or Firm* — David Cain; Andrew M. Calderon; Roberts Mlotkowski Safran Cole & Calderon, P.C.

(57) ABSTRACT

Methods and structures for shielding optical waveguides are provided. A method includes forming a first optical waveguide core and forming a second optical waveguide core adjacent to the first optical waveguide core. The method also includes forming an insulator layer over the first optical waveguide core and the second optical waveguide core. The method further includes forming a shielding structure in the insulator layer between the first optical waveguide core and the second optical waveguide core.

20 Claims, 7 Drawing Sheets

(51) Int. Cl.
*G02B 6/136* (2006.01)
*G02B 6/12* (2006.01)
*G02B 1/04* (2006.01)
*G02B 6/132* (2006.01)

(56) References Cited

U.S. PATENT DOCUMENTS

| | | | |
|---|---|---|---|
| 6,169,825 B1 | 1/2001 | Morey et al. | |
| 6,298,178 B1 | 10/2001 | Day et al. | |
| 6,403,393 B1* | 6/2002 | Adkisson | G02B 6/122 216/24 |
| 6,621,972 B2* | 9/2003 | Kimerling | G02B 6/12 385/129 |
| 6,678,452 B1 | 1/2004 | Bloechl et al. | |
| 6,687,446 B2 | 2/2004 | Arakawa | |
| 6,701,054 B1 | 3/2004 | Urruti | |
| 7,010,207 B2* | 3/2006 | Nakata | G02B 6/122 216/24 |
| 7,016,587 B2* | 3/2006 | Kubby | G02B 6/136 385/129 |
| 7,116,880 B1* | 10/2006 | Liu | G02B 6/122 385/129 |
| 7,138,697 B2* | 11/2006 | Chu | H01L 31/101 257/347 |
| 7,181,121 B2* | 2/2007 | Kuramoto | G02B 6/1221 385/129 |
| 7,376,310 B2 | 5/2008 | Wiesmann et al. | |
| 7,563,628 B2 | 7/2009 | Koch et al. | |
| 7,949,220 B2 | 5/2011 | Shibata et al. | |
| 8,025,444 B2 | 9/2011 | Choi et al. | |
| 8,394,705 B2* | 3/2013 | Kim | G02B 6/132 257/509 |
| 2003/0185534 A1* | 10/2003 | Kaneko | G02B 6/12004 385/129 |
| 2004/0201026 A1* | 10/2004 | Gill | G02B 6/12007 257/79 |
| 2004/0208465 A1* | 10/2004 | Logvin | G02B 6/125 385/129 |
| 2004/0228570 A1* | 11/2004 | Logvin | G02B 6/122 385/15 |
| 2005/0152658 A1 | 7/2005 | Keyser | |
| 2005/0184354 A1* | 8/2005 | Chu | H01L 31/101 257/458 |
| 2008/0044130 A1* | 2/2008 | Pitwon | G02B 6/122 385/14 |
| 2008/0310808 A1 | 12/2008 | Fried et al. | |
| 2009/0123116 A1* | 5/2009 | Tanaka | G02B 6/4201 385/92 |
| 2011/0053095 A1* | 3/2011 | Sakuma | G02B 6/124 430/321 |
| 2011/0188530 A1* | 8/2011 | Lell | H01S 5/0078 372/49.01 |
| 2012/0003782 A1* | 1/2012 | Byun | H01L 27/14625 438/72 |
| 2012/0219249 A1* | 8/2012 | Pitwon | G02B 6/138 385/14 |
| 2012/0251041 A1 | 10/2012 | Ishikawa et al. | |

OTHER PUBLICATIONS

Wang et al., "Near-Infrared Absorbing Organic Materials", Pure and Applied Chemistry, vol. 76, Nos. 7-8, 2004, pp. 1435-1443.

* cited by examiner

SHIELDING STRUCTURES BETWEEN OPTICAL WAVEGUIDES

FIELD OF THE INVENTION

The invention relates to optical waveguide devices and, more particularly, to structures and methods of isolating optical waveguides.

BACKGROUND

An optical waveguide device typically includes a substrate, a cladding layer formed on the substrate, and a waveguide—also called waveguide core—formed in the cladding layer for transmitting an optical signal. Such waveguide devices are also called integrated optical devices or opto-electronic integrated circuits. The core commonly has the shape of a strip or a rib. Light signals may be introduced into and out of the core by coupling optical fibers thereto. The core has a top surface and opposing parallel side walls. The core serves to confine an optical light signal transmitted thereto, and the light signal is mostly contained in the core as it is transmitted therethrough.

Complementary metal oxide semiconductor (CMOS) processes, such as masking and etching, are commonly used to form the core. Etching, such as reactive ion etching (RIE), can result in core side wall roughness that causes scattering of light propagating along the waveguide. This light scattering produces an optical loss in the waveguide, and can also lead to cross talk between adjacent waveguides. Isolation of waveguides is routinely accomplished by differences in index of refraction of the materials that make up the core and the cladding layer. However, differences in index of refraction between the core and a cladding material do not completely eliminate undesired communication between adjacent cores.

SUMMARY

In a first aspect of the invention, there is a method of manufacturing an optical waveguide device. The method includes forming a first optical waveguide core and forming a second optical waveguide core adjacent to the first optical waveguide core. The method also includes forming an insulator layer over the first optical waveguide core and the second optical waveguide core. The method further includes forming a shielding structure in the insulator layer between the first optical waveguide core and the second optical waveguide core.

In another aspect of the invention, there is a method of manufacturing an optical waveguide device. The method includes forming an optical waveguide core. The method also includes forming an array of fill shape shielding structures on opposing sides of the optical waveguide core, wherein each one of the fill shape shielding structures comprises a highly reflective material or a highly absorptive material.

In another aspect of the invention, there is an optical waveguide device including a first optical waveguide core on an insulator layer and a second optical waveguide core adjacent to the first optical waveguide core. The device also includes an upper insulator layer over the first optical waveguide core and the second optical waveguide core. The device further includes a shielding structure in the upper insulator layer between the first optical waveguide core and the second optical waveguide core.

In another aspect of the invention, a design structure tangibly embodied in a machine readable storage medium for designing, manufacturing, or testing an integrated circuit is provided. The design structure comprises the structures of the present invention. In further embodiments, a hardware description language (HDL) design structure encoded on a machine-readable data storage medium comprises elements that when processed in a computer-aided design system generates a machine-executable representation of a shielding structure for optical waveguides which comprises the structures of the present invention. In still further embodiments, a method in a computer-aided design system is provided for generating a functional design model of a shielding structure for optical waveguides. The method comprises generating a functional representation of the structural elements of the shielding structure for optical waveguides.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention relates to optical waveguide devices and, more particularly, to structures and methods of isolating optical waveguides. According to aspects of the invention, a shielding structure composed of an absorptive or reflective material is arranged between adjacent optical waveguides to prevent transmission of errant light signals between the adjacent waveguides. In embodiments, a shielding structure comprising a highly absorptive material or a highly reflective material is formed between adjacent optical waveguides. By reducing optical cross talk between the adjacent optical waveguides, the shielding structure improves optical signal quality and lessens layout/design restrictions on the optical waveguides. For example, by reducing optical cross talk between adjacent optical waveguides, implementations of the invention may permit the usage a finer pitch and/or tighter radius curves in optical waveguides.

Figure 1:
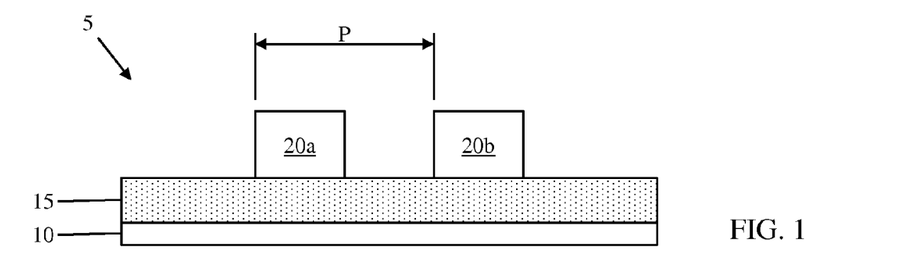
FIGS. 1-18 show views of structures and respective processing steps in accordance with aspects of the invention.

FIGS. 1-18 show processing steps and respective structures in accordance with aspects of the invention. Specifically, FIG. 1 shows an optical waveguide device 5 including a substrate 10, an insulator layer 15 formed on the substrate 10, and two optical waveguide cores 20a and 20b formed on the insulator layer 15. The optical waveguide device 5 may be fabricated using conventional CMOS materials and processes. For example, the cores 20a and 20b may be formed by masking and etching a silicon layer of a silicon-on-insulator (SOI) wafer that comprises the substrate 10 and insulator layer 15.

The constituent materials of the optical waveguide device 5 may be selected based on the desired end use application of the device. For example, the substrate 10 may be composed of any suitable material including conductor materials, semiconductor material, and dielectric materials. More specifically, the substrate 10 may be composed of Si, SiGe, SiGeC, SiC, GE alloys, GaAs, InAs, InP, and other III/V or II/VI compound semiconductors.

The insulator layer 15 may be composed of a dielectric material such as, for example, $SiO_2$ or other oxides. In embodiments, the insulator layer 15 is composed of a material that has an index of refraction that is less than the index of refraction of the material of the cores 20a, 20b.

The cores 20a, 20b may comprise silicon, such as single crystal silicon, polysilicon, silicon nitride, silicon oxy-nitride, or other silicon-based materials. In embodiments, the cores 20a, 20b are composed of a material that has an index of refraction that is greater than the index of refraction of the material of the insulator layer 15, and that is also greater than the index of refraction of a material later-formed on the surfaces of the cores 20a, 20b.

The substrate 10, insulator layer 15 and cores 20a, 20b may have any desired thickness in the vertical direction, e.g., in the direction perpendicular to the interface between the insulator layer 15 and the cores 20a, 20b. In a non-limiting example, the substrate 10 has a thickness of about 500 µm to about 700 µm, the insulator layer 15 has a thickness of about 1.0 µm to about 15 µm, and the cores 20a, 20b each have a thickness of about 0.1 µm to about 0.3 µm. The cores 20a and 20b may have any desired width in the horizontal direction, e.g., in the direction parallel to the interface between the insulator layer 15 and the cores 20a, 20b. In a non-limiting example, the cores 20a, 20b each have a width of about 0.1 µm to about 0.3 µm.

Still referring to FIG. 1, there is a pitch dimension "P" associated with the adjacent cores 20a and 20b. In particular, the pitch "P" is the horizontal distance from the left side edge of the first core 20a to the left side edge of the second core 20b. In conventional waveguide systems, a minimum pitch between adjacent waveguides is limited by the cross talk between the adjacent waveguides, i.e., the pitch must be sufficiently large to reduce unwanted cross talk. Implementations of the invention permit use of a smaller pitch by placing shielding structures between the adjacent cores 20a and 20b as described in greater detail herein.

Figure 2:
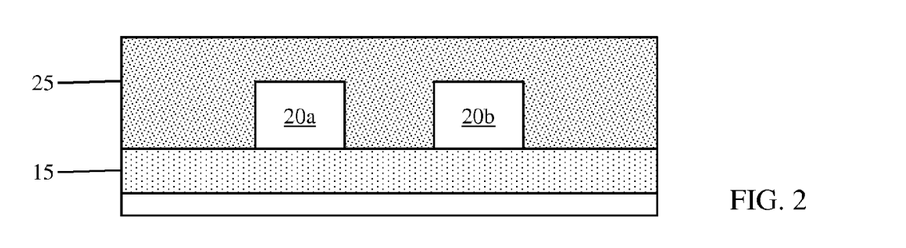

As depicted in FIG. 2, an upper insulator layer 25 is formed on exposed surfaces of the insulator layer 15 and the cores 20a, 20b. The upper insulator layer 25 may be any dielectric material that has an index of refraction less than the index of refraction of the material of the cores 20a, 20b. In embodiments, the upper insulator layer 25 comprises oxide, such as silicon oxide or the like, and is formed using a suitable conventional process such as thermal oxidation, chemical vapor deposition (CVD), etc.

Figure 3:
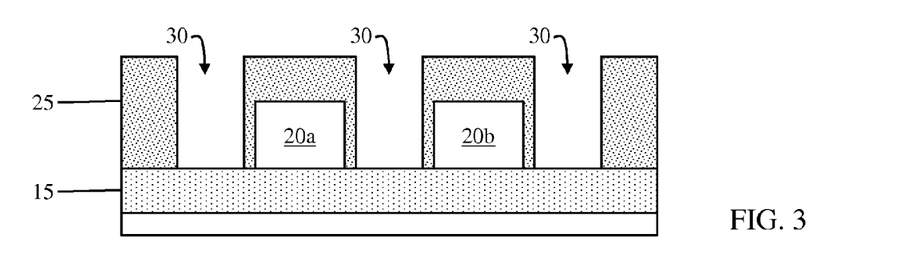

Next, as depicted in FIG. 3, at least one trench 30 is formed in the upper insulator layer 25 between the cores 20a, 20b. In embodiments, the at least one trench 30 extends to the insulator layer 15. The at least one trench 30 may be formed using conventional techniques, such as photolithographic masking and etching. For example, a photomask may be provided by forming a layer of photoresist material on the upper insulator layer 25, exposing the photoresist material to a pattern of light, and developing the exposed photoresist material. An etching process, such as a reactive ion etch (RIE), may then be used to remove portions of the upper insulator layer 25 that are not covered by the photomask. After etching, the photomask may be removed using a conventional ashing or stripping process.

Figure 4:
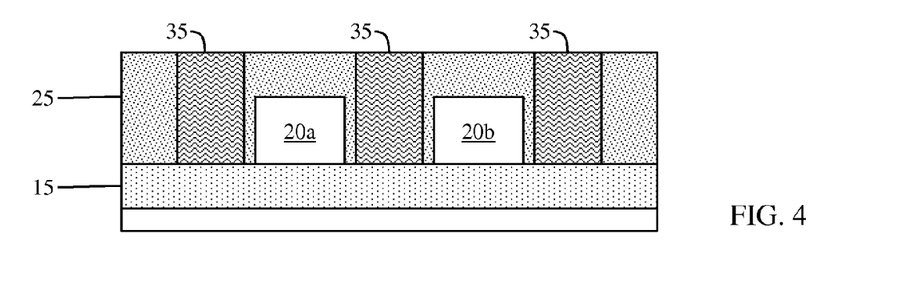

Next, as shown in FIG. 4, a shielding structure 35 is formed in the at least one trench 30 between the cores 20a and 20b. In aspects of the invention, the shielding structure 35 comprises an absorptive material that is configured to prevent the transmission of light from one core 20a to the other core 20b, and vice versa. In embodiments, the absorptive material of the shielding structure 35 comprises Germanium (Ge), C doped SiCOH, $WO_3$ (tungsten oxide), semiquinones (polyether poly-4), dinuclear mixed-valence ruthenium (Ru) complexes, or poly(3,4-ethylenedioxythiophene) (PEDOT). The invention is not limited to these materials, however, and any material that is highly absorptive of the wavelength of light propagated in the cores 20a and 20b may be used within the scope of the invention. As used herein, the phrase highly absorptive refers to a material having an optical absorbance of at least 0.1 µm at the wavelength of light propagated in the cores 20a and 20b. In aspects, highly absorptive may also refer to a material in which light intensity is reduced by a factor of 1/e within two to three microns. In this manner, implementations of the invention reduce optical noise and coupling between the cores 20a and 20b. The absorptive material of the shielding structure 35 may be formed in the at least one trench 30 using any suitable conventional process, such as CVD, spin-on, etc.

Figure 5:
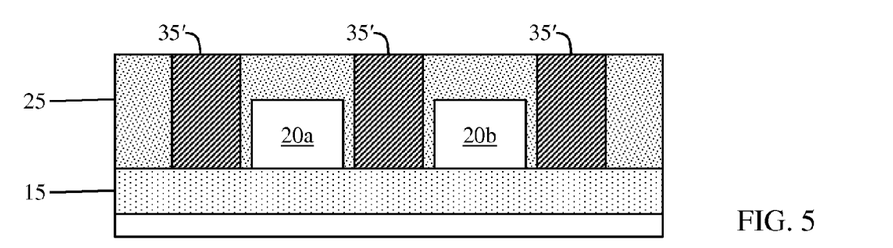

FIG. 5 shows an alternate embodiment in which the shielding structure 35' is formed of a reflective material. In aspects of the invention, the shielding structure 35' comprises a reflective material that is configured to prevent the transmission of light from one core 20a to the other core 20b, and vice versa. In embodiments, the reflective material of the shielding structure 35' comprises metal such as tungsten (W), Aluminum (Al) or Copper (Cu). The reflectance can also be achieved by a change in index of refraction between two materials, such as two dielectric materials having different indexes of refraction such that the junction between the materials reflects the light. The invention is not limited to these materials, however, and any material that is highly reflective of the wavelength of light propagated in the cores 20a and 20b may be used within the scope of the invention. As used herein, the phrase highly reflective refers to a material having an optical reflectivity of at least 50% at the wavelength of light propagated in the cores 20a and 20b. In this manner, implementations of the invention reduce optical noise and coupling between the cores 20a and 20b. The reflective material of the shielding structure 35' may be formed in the at least one trench 30 using any suitable conventional process, such as CVD, sputtering, etc.

Figure 6:
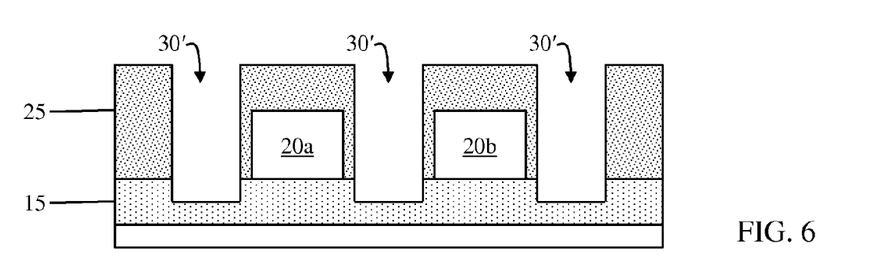
Figure 7:
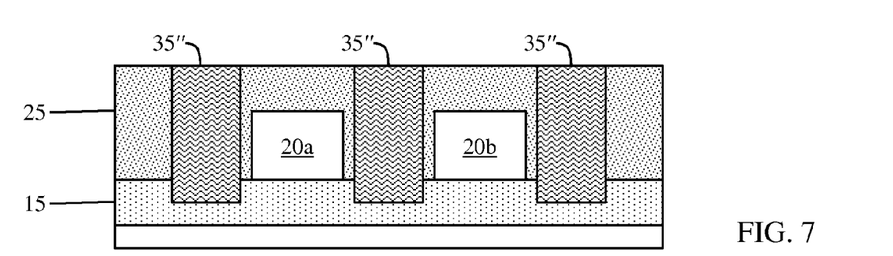
Figure 8:
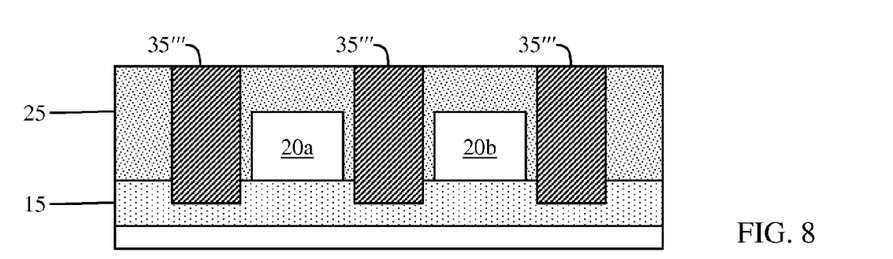

FIG. 6 shows an implementation in which the at least one trench 30' is formed entirely through the upper insulator layer 25 and extends into the insulator layer 15. FIG. 7 shows a shielding structure 35" comprising highly absorptive material formed in the at least one trench 30'. FIG. 8 shows a shielding structure 35'" comprising highly reflective material formed in the at least one trench 30'. Extending the shielding structure 35"/35'" below the bottom of the cores 20a, 20b may be used to improve immunity to crosstalk between the cores 20a, 20b.

Figure 9:
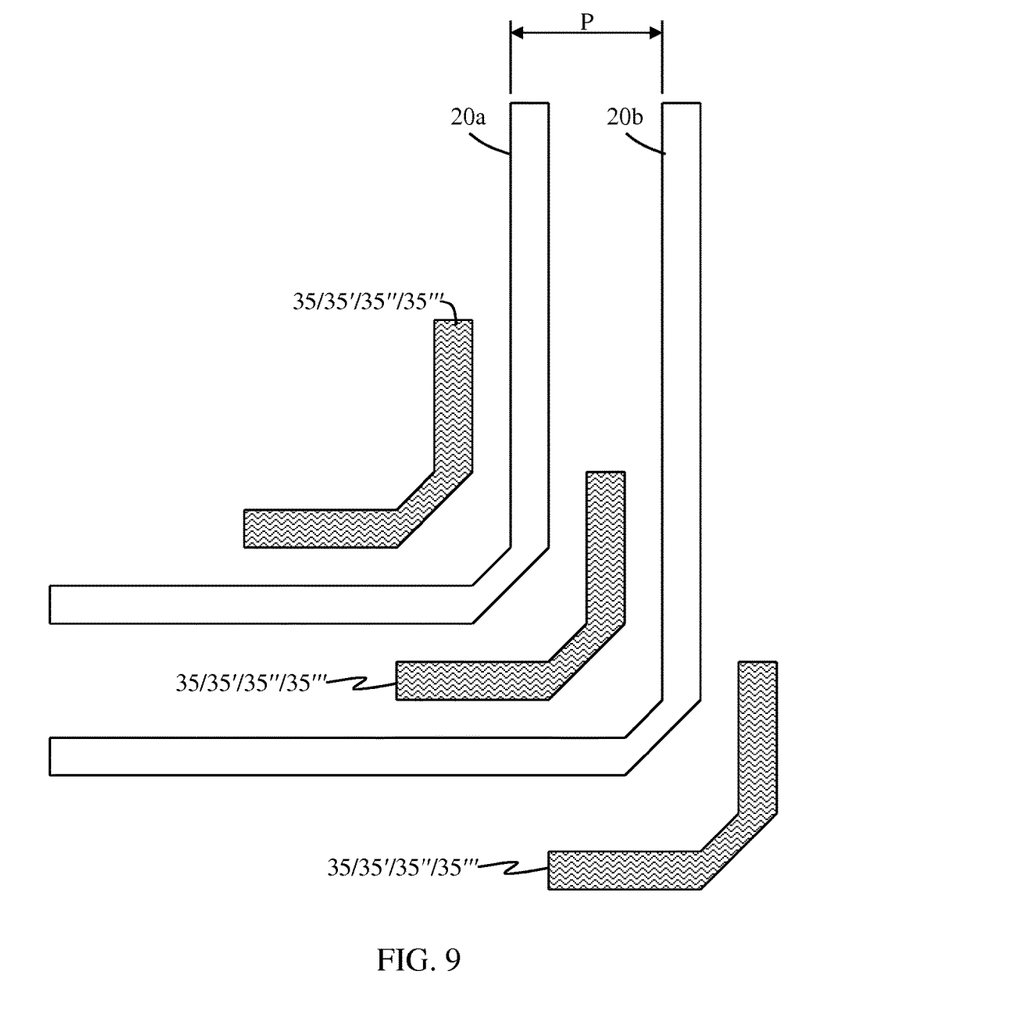

FIG. 9 shows an exemplary arrangement of shielding structures 35/35'/35"/35'" relative to cores 20a, 20b in accordance with aspects of the invention. In embodiments, the shielding structures 35/35'/35"/35'" are placed at locations at which light is most likely to leak out of or into adjacent waveguides. For example, as shown in FIG. 9, the shielding structures 35/35'/35"/35'" may be confined to locations corresponding to bends in the cores 20a, 20b. According to aspects of the invention, the shielding structures 35/35'/35"/35'" permit the cores 20a, 20b to have smaller radius bends and/or be placed at a finer pitch "P" compared to a minimum pitch that would be permitted in a structure without such shielding structures.

Figure 10:
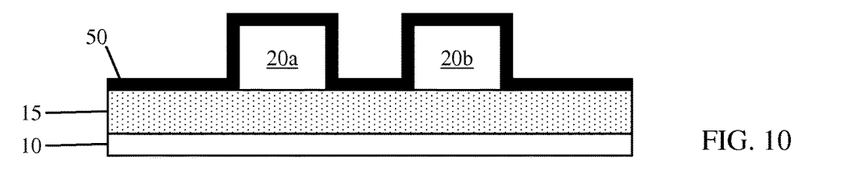

FIGS. 10-13 show an implementation of a cladding layer with shielding structures in accordance with aspects of the invention. Starting from the structure of FIG. 1, FIG. 10 depicts forming a cladding layer 50 on the exposed surfaces of the insulator layer 15 and cores 20a, 20b. In embodiments, the cladding layer 50 is composed of a dielectric material that has an index of refraction that is less than the index of refraction of the cores 20a, 20b. For example, the cladding layer 50 may comprise nitride (e.g., silicon nitride) or similar material formed using a conformal deposition process such as CVD or the like.

Figure 11:
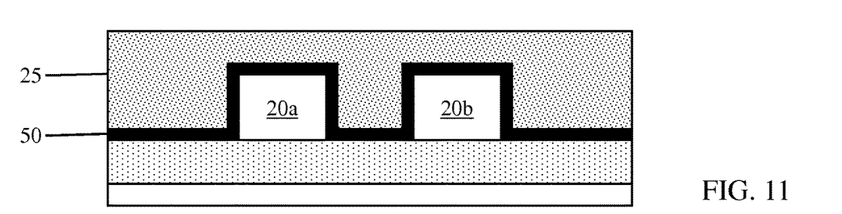

Next, as shown in FIG. 11, an upper insulator layer 25 is formed on and over the cladding layer 50. In embodiments, upper insulator layer 25 is composed of a different dielectric material than cladding layer 50. In a particular exemplary embodiment, the cores 20a, 20b comprise silicon (e.g., single crystal or poly), the cladding layer 50 is composed of nitride, and the upper insulator layer 25 is composed of oxide, although other combinations of materials may be used within the scope of the invention.

Figure 12:
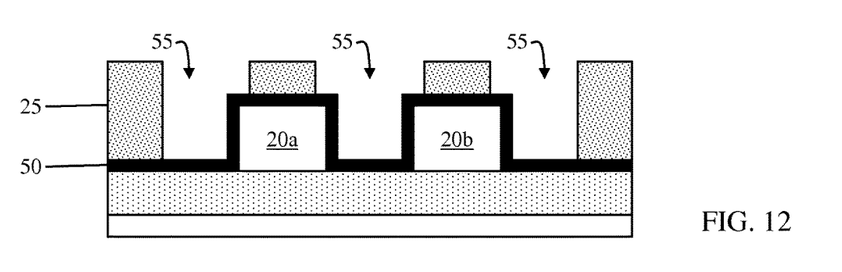

Next, as shown in FIG. 12, at least one trench 55 is formed in the upper insulator layer 25. In embodiments, the at least one trench 55 exposes portions of the cladding layer 50 between the cores 20a, 20b. The at least one trench 55 may be formed, for example, using photolithographic masking and etching as described herein.

Figure 13:
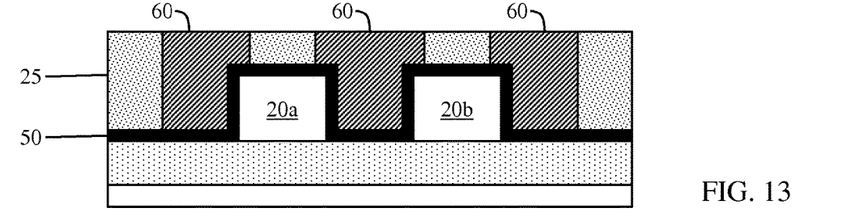

Next, as shown in FIG. 13, at least one shielding structure 60 is formed in the at least one trench 55. In embodiments, the shielding structure 60 is composed of a highly reflective material, e.g., similar to shielding structure 35'. In this manner, implementations of the invention further reduce unwanted cross talk between cores 20a and 20b by providing both a cladding layer 50 and a reflective shielding structure 60 between the cores 20a and 20b. In embodiments, the cladding layer 50 extends along the entire length of the cores 20a and 20b, while the shielding structure 60 may be located at select location(s) along the length of the cores 20, 20b, e.g., similar to that shown in FIG. 9.

Figure 14:
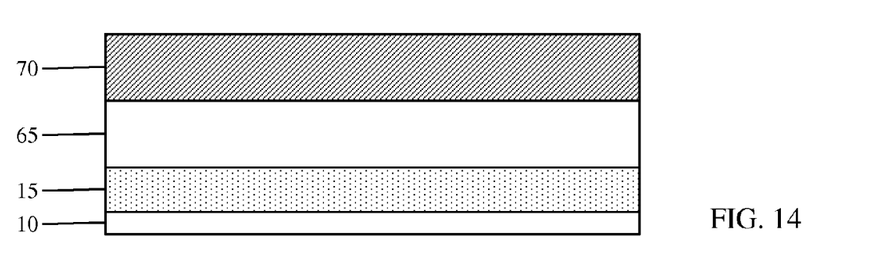

FIGS. 14-17 show an implementation of an array of fill shape shielding structures in accordance with aspects of the invention. FIG. 14 shows an SOI wafer including a substrate 10, insulator layer 15, and silicon layer 65. As further depicted in FIG. 14, a shielding material layer 70 is formed on and over the silicon layer 65. In embodiments, the shielding material layer 70 comprises either a highly absorptive or highly reflective material. In a particular embodiment, the shielding material layer 70 is composed of Ge.

Figure 15:
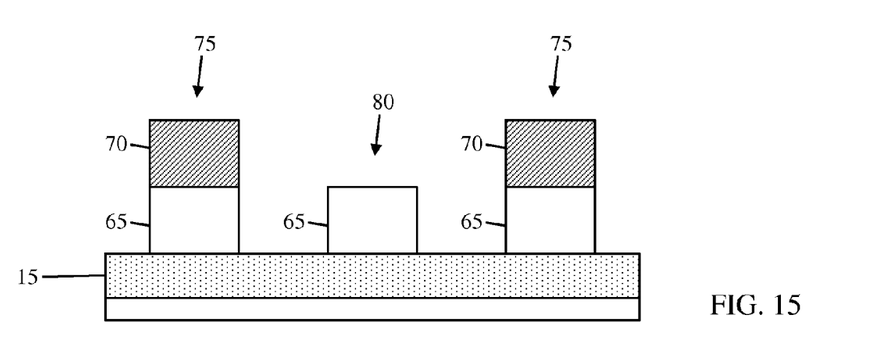

As shown in FIG. 15, the shielding material layer 70 and silicon layer 65 are patterned to form a plurality of shapes 75 and 80. Each shape 75 includes a lower portion comprising material of the silicon layer 65 and an upper portion comprising material of the shielding material layer 70. Shape 80 includes only a portion of the silicon layer 65 without including any portion of the shielding material layer 70. The patterning may be performed using conventional techniques, such as masking and etching. For example, a first masking and etching process may be used to remove portions of both the shielding material layer 70 and silicon layer 65 from between the shapes 75 and 80, and a second masking and etching process may be used to remove the shielding material layer 70 from the top of shape 80 without etching the shapes 75.

Figure 16:
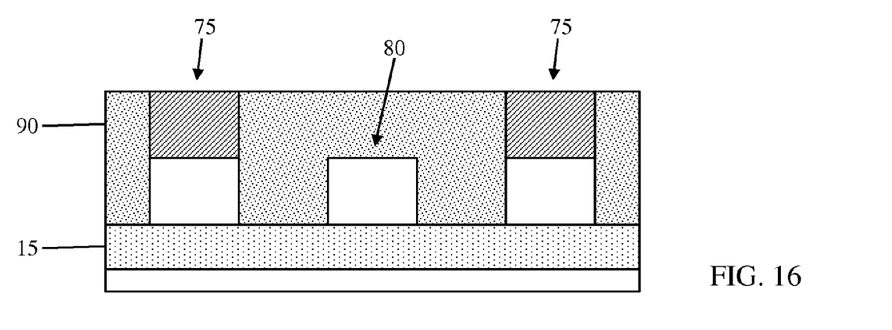
Figure 17:
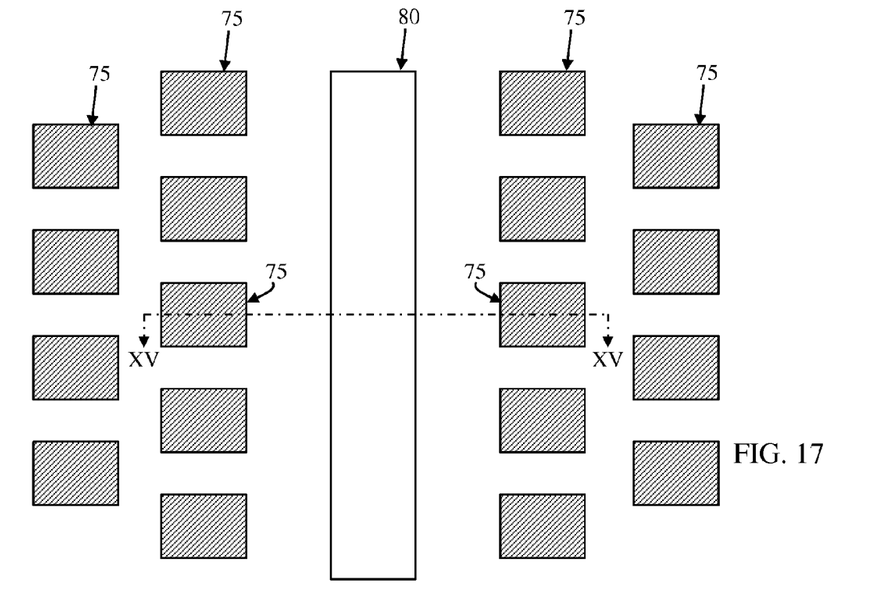

Next, as shown in FIG. 16, an upper insulator layer 90 is formed and the structure is planarized, e.g., using chemical mechanical polish (CMP). The upper insulator layer 90 may be of similar material and fabrication as upper insulator layer 25. FIG. 17 shows a plan view of the structure of FIG. 15 as indicated by line XV-XV, prior to the formation of the insulator layer as depicted in FIG. 16. As shown in FIG. 17, the shape 80 constitutes an optical waveguide core and the shapes 75 constitute an array of fill shape shielding structures. According to aspects of the invention, the array of fill shape shielding structures performs the dual function of optically isolating the optical waveguide core (e.g., shape 80) and assisting with planarity (e.g., during CMP) and pattern factor issues (e.g., during design).

Figure 18:
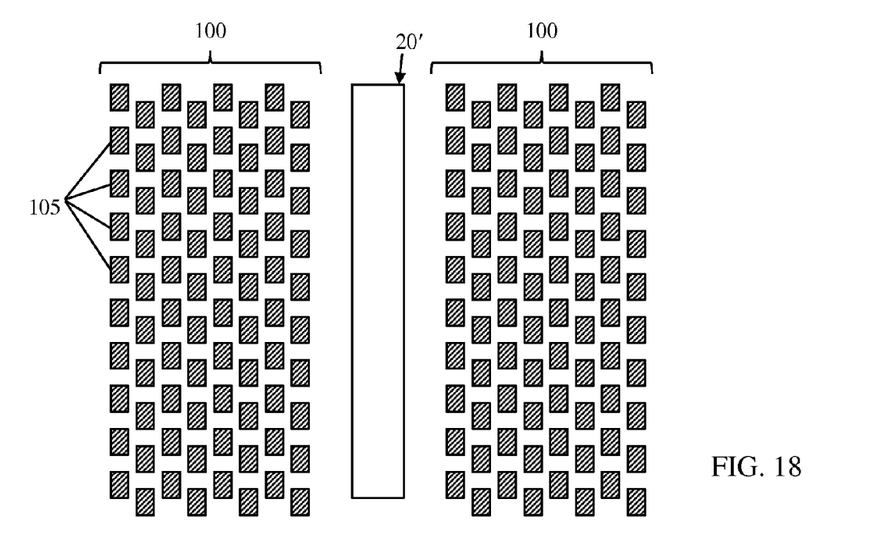

FIG. 18 shows a plan view of an implementation of an optical waveguide core 20' flanked by an array 100 of fill shape shielding structures 105 in accordance with aspects of the invention. The core 20' may be formed in a manner similar to that described with respect to cores 20a, 20b shown in FIG. 1. The fill shape shielding structures 105 may be formed in a manner similar to that described with respect to shielding structures 35' shown in FIG. 1. More specifically, the fill shape shielding structures 105 may be formed as a plurality of tungsten fill structures that are formed simultaneously with tungsten contacts in other portions of the device.

Figure 19:
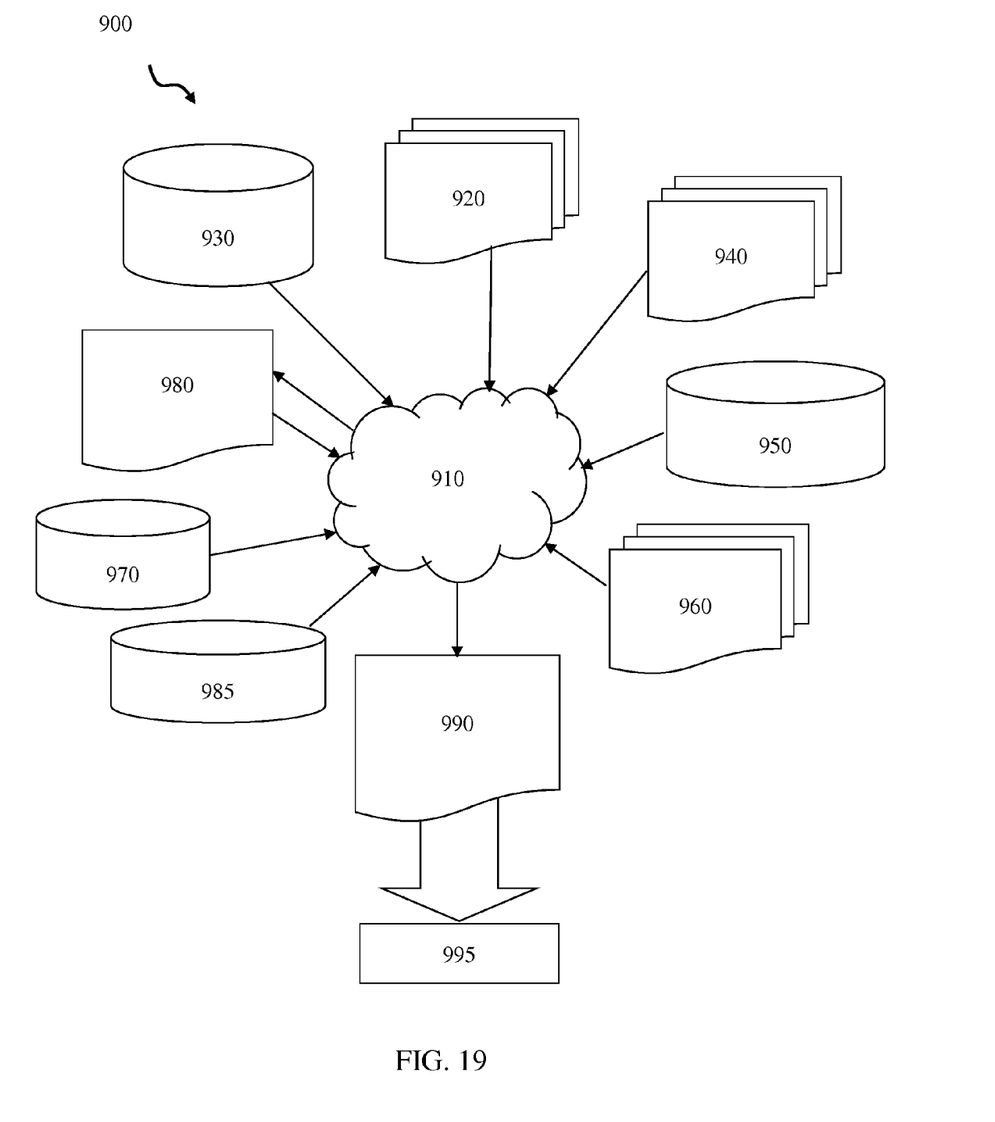
FIG. 19 is a flow diagram of a design process used in semiconductor design, manufacture, and/or test.

FIG. 19 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 1-18. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 19 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer.

When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1-18. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1-18 to generate a Netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including Netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990. Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-18. In one embodiment, design structure 990 may comprise a compiled, executable HDL simulation model that functionally simulates the devices shown in FIGS. 1-18.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-18. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An optical waveguide device, comprising:
    a first optical waveguide core directly on and in contact with an insulator layer;
    a second optical waveguide core adjacent to the first optical waveguide core;
    an upper insulator layer formed directly on surfaces of the first optical waveguide core and on surfaces of the second optical waveguide core; and
    a shielding structure in a trench in the upper insulator layer between the first optical waveguide core and the second optical waveguide core, the shielding structure comprising a material configured to prevent the transmission of light from the first optical waveguide core to the second optical waveguide core,
    wherein the first optical waveguide core and the second optical waveguide core each comprise silicon; and
    the insulator layer and the upper insulator layer each comprise oxide.

2. The device of claim 1, wherein the shielding structure comprises a highly absorptive material in the trench in the upper insulator layer.

3. The device of claim 2, wherein the highly absorptive material comprises Germanium.

4. The device of claim 2, wherein the highly absorptive material comprises C doped SiCOH.

5. The device of claim 2, wherein the highly absorptive material comprises tungsten oxide ($WO_3$).

6. The device of claim 2, wherein the highly absorptive material comprises semiquinones (polyether poly-4).

7. The device of claim 2, wherein the highly absorptive material comprises dinuclear mixed-valence ruthenium (Ru) complexes.

8. The device of claim 2, wherein the highly absorptive material comprises poly(3,4-ethylenedioxythiophene) (PEDOT).

9. The device of claim 2, wherein the highly absorptive material is a material having an optical absorbance of at least 0.1 μm at the wavelength of light propagated in the first optical waveguide core and the second optical waveguide core.

10. The device of claim 2, wherein the highly absorptive material is a material in which light intensity is reduced by a factor of 1/e within two to three microns.

11. The device of claim 1, wherein the first optical waveguide core and the second optical waveguide core each contact the insulator layer.

12. The device of claim 11, wherein the insulator layer is on and contacting a substrate comprising silicon.

13. The device of claim 12, wherein:
    the substrate has a thickness of 500 μm to 700 μm;
    the insulator layer has a thickness of 1.0 μm to 15 μm; and
    the first optical waveguide core and the second optical waveguide core each has a thickness of 0.1 μm to 0.3 μm.

14. An optical waveguide device, comprising:
    a first optical waveguide core directly on an insulator layer;
    a second optical waveguide core adjacent to the first optical waveguide core;
    an upper insulator layer formed directly on surfaces of the first optical waveguide core and on surfaces of the second optical waveguide core; and
    a shielding structure in a trench in the upper insulator layer between the first optical waveguide core and the second optical waveguide core, wherein the shielding structure comprises a highly absorptive material configured to prevent the transmission of light from the first optical waveguide core to the second optical waveguide core and the upper insulating layer is comprised of a material different from the material of the shielding structure;
    the first optical waveguide core and the second optical waveguide core comprise single crystal silicon; and
    the highly absorptive material comprises one of: C doped SiCOH, and tungsten oxide ($WO_3$).

15. The device of claim 14, wherein:
    the insulator layer and the upper insulator layer each comprise oxide; and
    the insulator layer is on and contacting a silicon substrate.

16. An optical waveguide device, comprising:
    a first optical waveguide core directly on an insulator layer;
    a second optical waveguide core adjacent to the first optical waveguide core;
    an upper insulator layer formed directly on surfaces of the first optical waveguide core and on surfaces of the second optical waveguide core; and
    a shielding structure in a trench in the upper insulator layer between the first optical waveguide core and the second optical waveguide core, the shielding structure comprising a material configured to prevent the transmission of light from the first optical waveguide core to the second optical waveguide core, wherein the material of the upper insulator layer is different from the material of the shielding structure,
    wherein the shielding structure is between a bend of the first optical waveguide core and a bend of the second optical waveguide core.

17. The device of claim 16, wherein the shielding structure comprises a highly absorptive material in the trench in the upper insulator layer and is confined to locations corresponding to the bend of the first optical waveguide core and the bend of the second optical waveguide core.

18. The device of claim 17, wherein:
    the insulator layer comprises oxide on a semiconductor substrate;
    the first optical waveguide core and the second optical waveguide core comprise silicon; and
    the highly absorptive material comprises one of: Germanium, C doped SiCOH, tungsten oxide ($WO_3$), semiquinones (polyether poly-4), dinuclear mixed-valence ruthenium (Ru) complexes, or poly(3,4-ethylenedioxythiophene) (PEDOT).

19. The device of claim 17, wherein the highly absorptive material is a material having an optical absorbance of at least 0.1 μm at the wavelength of light propagated in the first optical waveguide core and the second optical waveguide core.

20. The device of claim 17, wherein the highly absorptive material is a material in which light intensity is reduced by a factor of 1/e within two to three microns.

* * * * *